Figure 1:
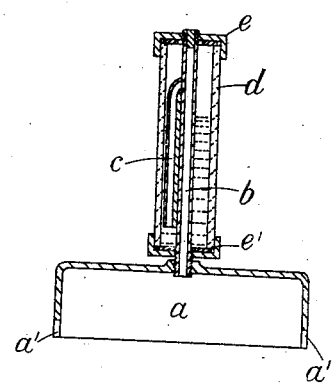

No. 894,156. PATENTED JULY 21, 1908.
J. LENDERYOU.
DEVICE FOR LOCATING AND DETERMINING PUNCTURES IN PNEUMATIC TIRES.
APPLICATION FILED DEC. 20, 1907.

Witnesses:
F. R. Pitton

Inventor:
John Lenderyou
his attorneys.

UNITED STATES PATENT OFFICE.

JOHN LENDERYOU, OF ROGERSTONE, MONMOUTH, ENGLAND.

DEVICE FOR LOCATING AND DETERMINING PUNCTURES IN PNEUMATIC TIRES.

No. 894,156. Specification of Letters Patent. Patented July 21, 1908.

Application filed December 20, 1907. Serial No. 407,381.

*To all whom it may concern:*

Be it known that I, JOHN LENDERYOU, a subject of the King of Great Britain, residing at Brookwood, Rogerstone, Monmouth, England, have invented certain new and useful Improvements in Devices for Locating and Detecting Punctures in Pneumatic Tires; and I do hereby declare the following to be a full, clear, and exact description of the invention, such as will enable others skilled in the art to which it appertains to make and use the same.

The object of this invention is to provide a device for readily detecting and locating punctures in pneumatic tires, and relates to the type of apparatus in which an air tube passes from air chamber, fitting the tire, into a glass chamber partly filled with water, the said tube being U shaped and coiled and the air from the tire passing from the same through the water in bubbles.

Now my said improved device consists of an aluminium or other light metal chamber open at the bottom, and the lower edges at the ends of which are suitably curved to fit the periphery of the tire. To the top of this chamber is screwed a vertical air tube fitted with an overflow or branch tube which extends downwards to within a short distance of the bottom of a glass tube or chamber through which the air tube passes and which is fitted watertight to the upper and lower ends of the central vertical air tube by screw-caps or nuts, or otherwise.

In using the device the air tube with the glass tube or chamber is unscrewed from the metal chamber or base and partly filled with water, by turning it over and holding its lower end under the water which enters through the passages formed by the tubes fitted to the caps or nuts. The said tube or chamber is then turned up and again screwed to the chamber or base ready for use.

In order to locate the puncture the tire is blown up or inflated and the metal chamber or base is then passed along the tire, pressing firmly thereon, in the usual manner, the stream of air escaping from the tire puncture up the central tube and down the branch tube into and up through the water in the form of bubbles.

To prevent any tendency of the water to siphon out of the tube a small air vessel may be fixed on the main or central tube into which vessel the air is fed from the latter and passes down the branch tube from the vessel to the water. In a modified arrangement, instead of the said air vessel, I may employ a small ball valve adapted to close an outlet passage for the air from the glass water tube or chamber and to permit of the escape of such air so as to prevent the siphoning action.

Figure 2:
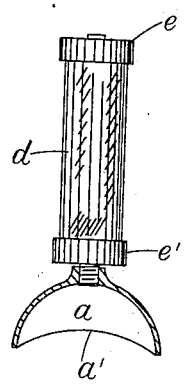
Figure 3:
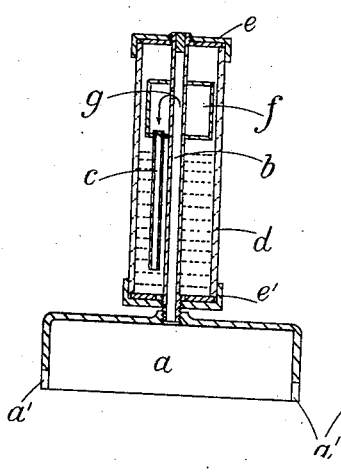
Figure 4:
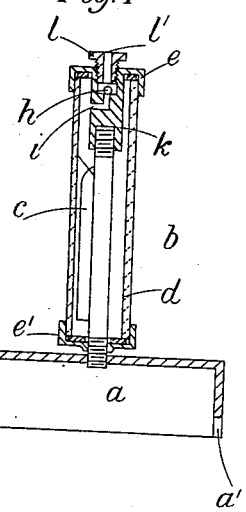

In the accompanying sheet of drawings Figure 1 shows a vertical section of the device, and Fig. 2 is an elevation at right angles to Fig. 1 with the air chamber or base in section. Fig. 3 is a vertical section showing the air vessel fitted to the air inlet tube, and Fig. 4 is a similar section showing the ball valve fitted to the air outlet passage from the water chamber.

$a$ is the chamber for receiving the air from the puncture, the ends $a^1$ of which are curved to fit the tire, and which chamber may be made of aluminium or other light material. $b$ is the air tube screwed to the top of said chamber and $c$ is the overflow or branch tube leading therefrom to the lower part of the water chamber. $d$ is the glass tube or water chamber inclosing the said tubes and fitted water-tight to the upper and lower ends of the tube $b$ by the screw caps or nuts $e$, $e^1$.

In order to locate a puncture the tube $b$ with the chamber $d$ is unscrewed from the chamber or base $a$ and is turned over and placed in water so that the latter covers the open end of the tube $b$. The water thus passes down the tube $b$ and through the tube $c$ into the chamber $d$, and when the latter is partly filled it is taken out of the water and screwed in position to the chamber $a$. The tire is then blown up or inflated and the chamber $a$ placed upon the same and firmly pressed thereon to make an air tight joint. The chamber is then passed along the tire still pressing thereon in the usual manner, until it reaches the puncture, when the position of the latter is at once shown by the stream of air escaping from the chamber $a$ up the tube $b$ and down the tube $c$ into the water in the glass tube $d$ wherein it rises in the form of bubbles visible to the operator.

In Fig. 3 the tube $b$ is fitted with a small air vessel or tank $f$ to which the tube $c$ is connected, the air passing from the tube $b$ through the small hole $g$ into the vessel $f$, from whence it escapes by the tube $c$ into the water in the glass tube $d$. The vessel $f$ thus prevents any siphoning or back-flow of the water down the tube $b$.

In the modification shown in Fig. 4 the vessel $f$ is dispensed with and the siphoning action is prevented by means of a small ball valve $h$ fitted to the air outlet passage $i$ formed in an extension $k$ of the nut or cap $e$ on the top of the glass chamber $d$. This permits of the air escaping from the said chamber but prevents it from returning and in order to prevent the water escaping from the same when turned upside down and when not in use, a milled head screw $l$, formed with an air passage $l'$, is fitted to the cap $e$ for screwing down upon the ball and thus closing the outlet $i$. The air chamber $a$ which may be made of vulcanite or other light material, and the tubes $b$ and $c$ are arranged and operate in a similar manner to those shown in Fig. 1.

In the forms shown in Figs. 1, 2 and 3, the air collected in the outer tube $d$ escapes therefrom by simply inverting the apparatus and permitting the water to displace the same, when the said air flows down the tube $c$ and out of the tube $b$.

Of course I do not desire to be limited to the exact details of my structure, since it is evident that the same may be varied without departing from the spirit of my invention.

Claims.

1. In an apparatus for detecting punctures in pneumatic tires, the combination of a chamber formed to fit the contour of the tire; a main air tube communicating with said chamber; caps $e$ secured to said tube at each end and provided with packing material and flanges; a glass tube $d$ surrounding said main air tube, having its ends closed by said flanged caps, and adapted to contain water, and a third tube $c$ communicating with said main air tube at one end, and delivering air under the said water at the other end, substantially as described.

2. In an apparatus for detecting punctures in pneumatic tires, the combination of a chamber formed to fit the contour of the tire; a main air tube communicating with said chamber; caps $e$ secured to said tube at each end and provided with packing material and flanges; a glass tube $d$ surrounding said main air tube, having its ends closed by said flanged caps, and adapted to contain water; a third tube $c$ communicating with said main air tube at one end, and delivering air under the said water at the other end and means to initially prevent the water from running into the tire, substantially as described.

3. In an apparatus for detecting punctures in pneumatic tires, the combination of a chamber formed to fit the contour of the tire; a main air tube communicating with said chamber; caps $e$ secured to said tube at each end and provided with packing material and flanges; a glass tube $d$ surrounding said main air tube, having its ends closed by said flanged caps, and adapted to contain water; a third tube $c$ communicating with said main air tube at one end, and delivering air under the said water at the other end, and means to initially prevent the water from running into the tire consisting of an air vessel $f$ with which said tube communicates, substantially as described.

In testimony whereof, I affix my signature, in presence of two witnesses.

JOHN LENDERYOU.

Witnesses:
   EDWIN JONES,
   HENRY MORRIS.